Jan. 23, 1951 A. RODEL 2,539,104
FOREHEAD LAMPS, PARTICULARLY FOR MEDICAL PURPOSES
Filed July 31, 1946
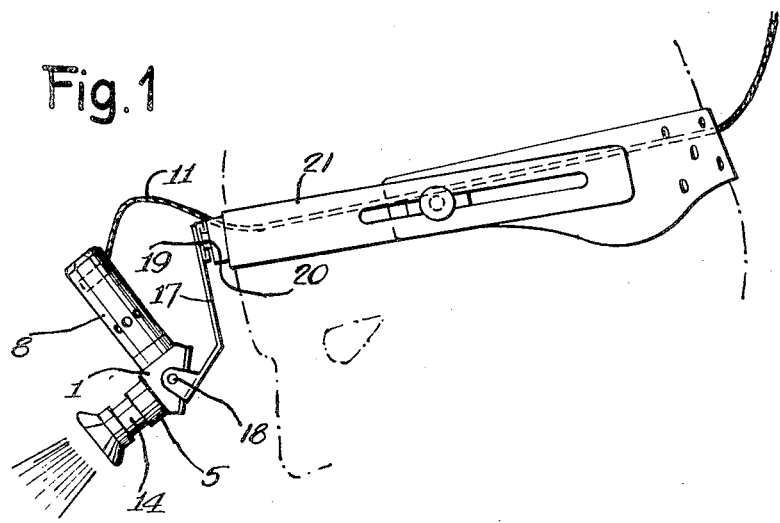
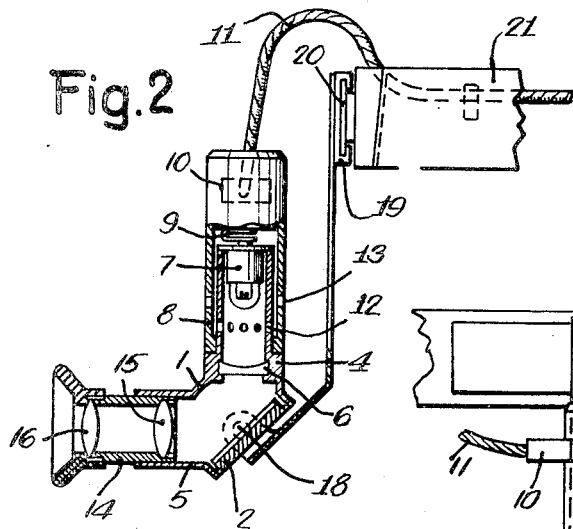
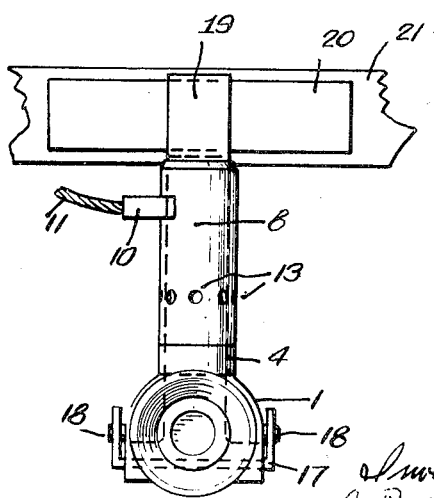

Patented Jan. 23, 1951

2,539,104

UNITED STATES PATENT OFFICE 2,539,104

FOREHEAD LAMPS, PARTICULARLY FOR MEDICAL PURPOSES

Arthur Rodel, Olten, Switzerland

Application July 31, 1946, Serial No. 687,364
In Switzerland July 26, 1945

Section 1, Public Law 690, August 8, 1946
Patent expires July 26, 1965

1 Claim. (Cl. 128—22)

The present invention relates to a fore-head lamp for medical purposes, provided with a forehead band and an adjustable light projector.

The fore-head lamp according to the invention comprises a condenser-lens, a mirror and a system of projecting lenses so arranged that the light rays of the light source passing through the condenser-lens impinge in an angle upon the mirror and that the rays reflected by the mirror through the system of projecting lenses light up the body to be viewed in the direction of vision as far as possible from the level of the frontal eye axis.

A fore-head lamp arranged in this manner, which may be employed chiefly in the practice of the specialist for maladies of the nose, throat and the ears, but also by surgeons, dentists and gynecologists, affords the principal advantage that it permits lighting up the object to be viewed from the level of the frontal eye axis so as to obviate all shadows prejudicing the view. In addition the present invention produces, in opposition to the hitherto used fore-head lamps, a field of light exempt of halo, and of an uniform brightness at a reduced weight.

An embodiment of the invention is illustrated schematically in the accompanying drawing, in which:

Fig. 1 is an elevational view of the fore-head lamp with the fore-head band;

Fig. 2 is a fragmentary enlarged view, partially in section, of the lamp; and

Fig. 3 is a view in front elevation seen from the front in Fig. 2.

As illustrated in the drawing, the fore-head lamp has 1 hemispherical housing $a$ made of metal or an artificial material and provided with a cover plate 2 carrying the plane mirror 3. The housing has further two tubular extensions 4 and 5, the axis of which are arranged in a plane perpendicular to the mirror 3. The axis of the two extension tubes 4 and 5 enclose together an angle of 90° and are inclined by an angle of 45° with respect to the mirror 3. At the inner end of the tube 4 is arranged the condenser-lens 6 and the incandescent lamp 7 is removably inserted in the outer end of said tube. A surrounding casing 8 is screwed on the tube 4 so that the incandescent lamp 7 is connected through the spring contact 9, plug contact 10 and supply cable 11 with the source of current, which may be a battery, an accumulator or a transformer.

The heat generated by the incandescent lamp 7 is carried off through the airing apertures 12 and 13 of the tube 4 or through the casing 8 respectively. These airing apertures 12 and 13 are located in a staggered arrangement in order to prevent direct light to issue from the interior of the tube 1. The tubular piece 14 with the projecting lenses 15 and 16 is rotatably supported and slidable in axial direction in the extension tube 5. The tubular piece 14 is provided with a helicoidal guide groove (not shown in the drawing) cooperating with a guide pin in the tube 5. An axial shifting of the optic system 15 and 16 is produced by rotating the tubular piece 14. The lamp is pivoted in the bracket 17 by means of the pivot pins 18 affixed on the housing 1. As clearly shown in Figs. 2 and 3, the bracket 17 is secured to a slide 19 carried on a cross bar 20 of the fore-head band 21 so as to permit a cross shifting of the bracket on said cross bar located above the eyes when the device is in use.

In use, the pivotable lamp can easily be arrested in a known manner in the midst of the front. When desired, it can also be shifted so as to be placed above one or the other eye, hence not in the midst of the front. The size and the brightness of the lighted area can be changed by rotating the system of projecting lenses.

The bracket 17 can also be arranged in a vertical guide which is mounted on the fore-head band for vertical adjustment and fixation by means of a clamping device. This guide may also be arranged on the fore-head band so as to be pivotable around a horizontal axis. The lamp may thus be adjusted in all directions even if the fore-head band is not quite properly adjusted on the head.

What I claim is:

A forehead lamp particularly for medical purposes, comprising a forehead band, a cross-bar member secured on said band, a carrier member adjustably mounted on said cross-bar member for adjustment thereon, said carrier member having a bottom portion angularly offset with respect to the remainder thereof, spaced lugs on said angularly offset portion at the lower end thereof, said spaced lugs constituting a bracket having a horizontal axis extending parallel to said cross-bar member, a light projector oscillatably journaled on said axis, said projector comprising a casing, a plane mirror arranged in said casing, two extension tubes on said casing having the axes thereof in a plane at right angles to said plane mirror and at right angles to one another, the axes of said tubes being inclined with respect to the mirror at an angle of 45°, whereby after adjustment of the forehead band on the head of a wearer, the light projector can itself be angularly adjusted so that the rays reflected by the mirror of the projector through the system of projecting lenses therein are directed approximately along the line of the eye axis of the wearer in the direction of vision and thereby light up that part of a body to be viewed which is in line with the eye axis of the wearer.

ARTHUR RODEL.

REFERENCES CITED

The following references are of record in the file of this patent:

UNITED STATES PATENTS

| Number | Name | Date |
|---|---|---|
| 738,887 | De Zeng | Sept. 15, 1903 |
| 1,217,666 | Thulin | Feb. 27, 1917 |
| 1,632,851 | Reaves | June 21, 1927 |
| 1,650,563 | Wolf | Nov. 22, 1927 |
| 1,705,465 | Cameron | Mar. 19, 1929 |
| 2,088,735 | Everhards | Aug. 3, 1937 |